FIXED READ-ONLY MEMORY

Filed Oct. 9, 1964

INVENTORS
DONALD H. MONTGOMERY
& STUART T. JOLLY
BY
Carl V. Olson
Attorney

United States Patent Office 3,404,386

Patented Oct. 1, 1968

3,404,386

FIXED READ-ONLY MEMORY

Donald H. Montgomery, Mantua, and Stuart T. Jolly, Collingswood, N.J., assignors to Radio Corporation of America, a corporation of Delaware Filed Oct. 9, 1964, Ser. No. 402,780
10 Claims. (Cl. 340—174)

This invention relates to fixed or read-only magnetic memories in which the digital information stored is permanently or semi-permanently established, as during manufacture, and from which any selected word of stored digital information may be read out by random-access electrical interrogation whenever desired.

It is a general object of this invention to provide an improved read-only memory characterized by economy of manufacture, and random-access read-out of stored information at very high operating speeds.

In accordance with an example of the invention, there is provided a fixed memory including top and bottom sheets of "soft" magnetic material assembled in sandwich fashion. The surface of the bottom sheet at the interface with the top sheet is provided with diagonal crosshatch grooves forming rows and columns of magnetic information storage elements each including a central square magnetic post and adjacent portions on first, second, third and fourth sides of four adjacent posts. Sense conductors positioned in the grooves each extend in zigzag fashion along first and second sides of all central magnetic posts of a column, and return along third and fourth sides of the central magnetic posts of the same column. Word conductors positioned in the grooves each extend in zigzag fashion along a row of central magnetic posts with the conductor positioned to pass along the first and fourth sides of central magnetic posts at which it is desired to store "0" information bits, and positioned to pass along the second and third sides of central posts at which it is desired to store "1" information bits. Reading is accomplished by applying a pulse to any selected one of the word conductors to induce signals in the sense conductors having polarities corresponding with stored information bits determined by the configuration of the selected word conductor.

Figures 1, 2:
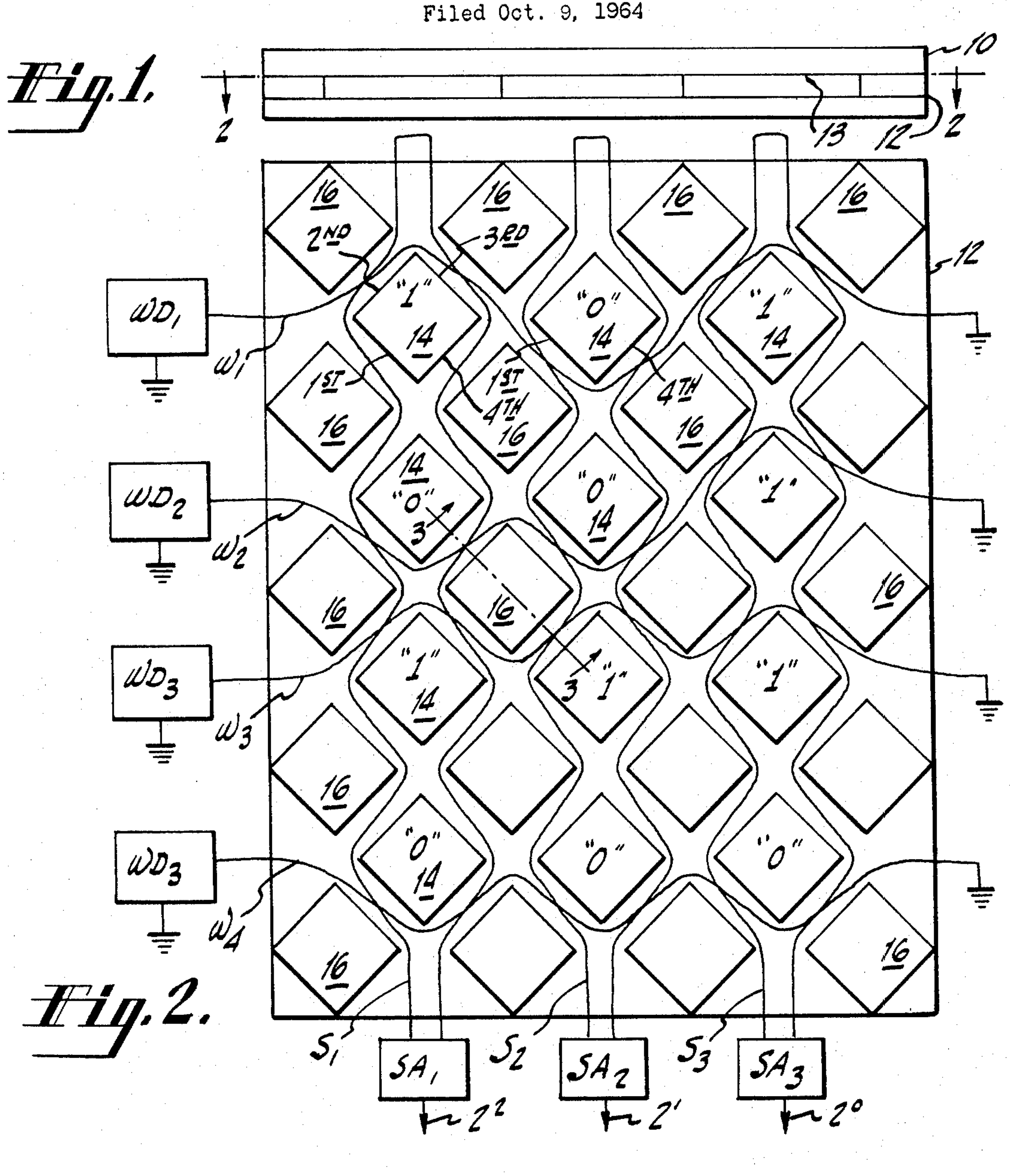
FIG. 1 is an elevation showing the edge of a two-part magnetic structure forming a part of a fixed memory according to the invention.
FIG. 2 is a sectional view taken on the line 2—2 of FIG. 1 showing interior construction, including winding configurations in schematic form.
Figure 3:
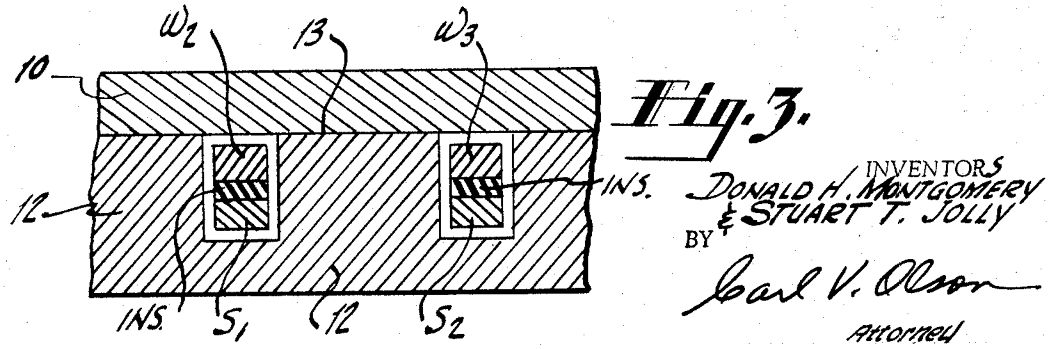
FIG. 3 is a fragmentary sectional view taken on the line 3—3 of FIG. 2 showing interior construction details.

Reference is now made to FIGS. 1 through 3 for a more detailed description of a fixed or read-only memory. The memory illustrated by way of example is constructed to permanently store four words each having three information bits. It will be understood that the scheme illustrated can be extended to provide for the storage of a much larger number of words each having a much larger number of information bits.

The fixed memory includes a top sheet 10 of magnetic material and a bottom sheet 12 of magnetic material, the two sheets being assembled in sandwich fashion with polished surfaces at the interface 13 between the two sheets. The magnetic sheets 10 and 12 are preferably constructed of a "soft" magnetic material of a type used for high speed pulse transformers. Ferrite materials are preferred because of the ease with which the material can be provided with milled slots. The top magnetic sheet 10 may similarly be a ferrite material. Alternatively, one or the other or both of the magnetic sheets may be constructed of a magnetic material such as magnetically "soft" Permalloy.

The surface of the bottom magnetic sheet 12 at the interface between the top and bottom sheets is provided with crosshatch grooves extending in directions diagonally related with the peripheral edges of the magnetic sheet 12. The crosshatch grooves form rows and columns of magnetic information storage elements each including a central square magnetic post 14 and adjacent portions on first, second, third and fourth sides of four adjacent posts 16.

In the memory illustrated, there are three central square magnetic posts 14 in each horizontal row and there are four central square magnetic posts 14 in each vertical column. Each of the milled grooves may be about five milli-inches wide and about ten milli-inches deep. The grooves may be uniformly spaced to provide square magnetic posts between the grooves having a dimension of about twenty milli-inches on each side. The grooves are preferably formed by passing ganged milling cutters over the surface in one diagonal direction and then passing the ganged cutters in the other orthogonally-related diagonal direction.

The triangular posts formed around the peripheral edge of the sheet 12 are omitted from FIG. 2 of the drawing for the purposes of clarity of illustration. The magnetic sheet shown in FIG. 2 may, in fact, be trimmed in size along its peripheral edges so that only triangular portions of the peripheral posts 16 remain. According to an alternative construction, one set of diagonal grooves is cut in the interface surface of the bottom magnetic sheet 12, and the other orthogonally-related set of parallel diagonal grooves is cut in the interface surface of the top magnetic sheet 10. This alternative method of construction simplifies the placing of conductors in the grooves, but it has the disadvantage of requiring a very careful registration of the top and bottom magnetic sheets when they are assembled together.

Before the magnetic sheets 10 and 12 are assembled and clamped together (by conventional means not shown), two sets of conductors are positioned in the crosshatch grooves. A set of zigzag sense conductors is arranged in the crosshatch grooves to extend generally in the vertical or column direction, and a set of zigzag word conductors is arranged in the crosshatch grooves to extend generally in the horizontal or row direction. The sense conductor $S_1$ associated with the first column of memory elements extends in zigzag fashion along first and second sides of all the central magnetic posts 14 of the first column, and returns in zigzag fashion along the third and fourth sides of the central magnetic posts 14 of the same first column. The second and third sense conductors $S_2$ and $S_3$ extend in similar fashion in relation to the second and third columns of central magnetic posts. The terminals of sense conductors $S_1$, $S_2$ and $S_3$ are connected to inputs of respective differential sense amplifiers $SA_1$, $SA_2$ and $SA_3$. The sense amplifiers provide outputs designated $2^2$, $2^1$ and $2^0$, each providing signals indicative of "0" and "1" information bits.

Word conductors $W_1$ through $W_4$ are arranged in the cross-hatch grooves in a zigzag fashion extending generally in the horizontal or row direction. Means are included to insure the sense conductors S and the word conductors W are electrically insulated from each other. The electrical insulation may take the form of a thin insulating layer INS. applied on top of the sense conductors in the grooves, as shown in FIG. 3. If the magnetic sheets 10 and 12 are made of a ferrite material, the material is an electrical insulator and there is no need to provide additional insulation between the conductors and the magnetic material. If the magnetic sheets are electrically conductive, the conductors S and W may be coated with insulation prior to being placed in the slots. Each word conductor is connected to a respective word driver $WD_1$ through $WD_4$. Each word driver supplies an interrogate pulse to the respective word conductor when it is desired to read out the information stored along the word conductor.

The word conductors W extend in a zigzag fashion which may be somewhat unsymmetrical in its excursions in accordance with the "0" and "1" information desired to be stored along the word conductor. For example, the word conductor $W_1$ progresses generally to the right by passing along the second and third sides of the first central square magnetic post 14, thence along the first and fourth sides of the second central magnetic post, and finally along the second and third sides of the third central magnetic post 14 to a return path such as ground. The word conductor $W_1$ passes along the second and third sides of the first square magnetic post 14 for the purpose, arbitrarily, of storing a "1" in the corresponding memory location. The word conductor $W_1$ extends along the first and fourth sides of the second central magnetic post 14 for the purpose of permanently storing a "0" information bit. The described scheme is followed in determining the course of all of the word conductors $W_1$ through $W_4$. The information bits stored in the memory array of FIG. 2 are indicated by the "0" and "1" designations on the respective central magnetic posts 14.

According to a preferred method of constructing the sense and digit conductors, a thin insulating plastic substrate is etched or cut so that it has holes corresponding in size and location to the magnetic posts 14 and 16. Sense windings are then applied to one side of the insulating substrate, and word conductors are applied to the other side of the conducting substrate. The conductors may be applied by any known suitable printing or deposition method. Then, the insulating substrate with its printed conductors is positioned in the grooves in the magnetic sheet 12. Thereafter, the top magnetic sheet 10 is assembled in sandwich fashion over the magnetic sheet 12 having the desired conductors in the grooves.

Instead of having just one set of word conductors $W_1$ through $W_4$ in the crosshatch grooves, it is possible to have a plurality of sets of word conductors in the grooves. In this case, each word conductor has a zigzag configuration designed to provide for the storage of a particular word of "0 or "1" information bits. A single set of sense conductors S, as shown, is all that is needed even when additional sets of word conductors are positioned in the same crosshatch grooves. The one word conductor of the plurality along a row of grooves would be selectively energized by external circuitry of known type.

In the operation of the fixed or read-only memory illustrated, an interrogate or read pulse is applied to a selected one of the word conductors $W_1$ through $W_4$. The interrogate current pulse in passing through the word conductor from left to right induces signals by transformer action in the several sense conductors. The polarities of the induced signals depend on the word conductor configuration. For example, the pulse passing through the word conductor $W_1$ induces a sense signal of the "1" polarity in the potion of sense winding $S_1$ on the second side of the central magneitc post 14 and induces a signal of the same "1" polarity in the portion of the sense conductor $S_1$ on the third side of the central magnetic post 14. The two induced signals of the same polarity add together and are conveyed through the sense conductor to the sense amplifier $SA_1$. The interrogate pulse in word conductor $W_1$ continues to the second memory element where the word conductor induces sense signals having a "0" polarity in the portions of the sense conductor $S_2$ on the first and fourth sides of the central magnetic post 14. The same interrogate pulse also induces sense signals of the "1" polarity on the third sense conductor $S_3$. In this way, whenever a word conductor is supplied with an interrogate pulse, signals are induced on the sense conductors having polarities corresponding with the "0" and "1" information bits stored along the word conductor. The path taken by the word conductor around each central magnetic post determines the "0" or "1" information bit stored in the respective memory location.

The conductor configuration shown in FIG. 2 may be described as one wherein a set of sense conductors each extends in symmetrical zigzag fashion in a first general direction (vertically), and a set of word conductors each extends in unsymmetrical zigzag fashion in a second orthogonal general direction (horizontally). The word conductors have unsymmetrical zigzag shapes determining the stored information bits along the word conductor. That is, the excursion of each part of the zigzag is greatest where a "0" bit is followed by a "1" bit, or a "1" bit is followed by a "0" bit. Either the word conductors, as shown, or the sense conductors can be arranged to determine the stored information. According to an alternative construction, the word conductors are made to have symmetrical zigzag shapes, and the sense conductors are made to have unsymmetrical zigzag shapes in accordance with the desired information storage.

What is claimed is:

1. A fixed memory comprising
a sheet of magnetic material having imbedded conductors arranged to define a diagonal crosshatch pattern forming rows and columns of magnetic information storage elements each including a central square magnetic post and adjacent portions on first, second, third and fourth sides of four adjacent posts,
said conductors including sense conductors each extending in zigzag fashion along first and second sides of all central magnetic posts of a column and returning along third and fourth sides of the central magnetic posts of the same column, and
said conductors also including word conductors each extending in zigzag fashion along a row of central magnetic posts with the conductor positioned to pass along the first and fourth sides of a central magnetic post at which it is desired to store "0" information bits, and positioned to pass along the second and third sides of central posts at which it is desired to store "1" information bits.

2. A fixed memory comprising
top and bottom sheets of magnetic material assembled in sandwich fashion, at least one surface at the interface between the top and bottom sheets being provided with diagonal crosshatch grooves forming rows and columns of magnetic information storage elements each including a central square magnetic post and adjacent portions on first, second, third and fourth sides of four adjacent posts,
sense conductors in said grooves each extending in zigzag fashion along first and second sides of all central magnetic posts of a column, and
word conductors in said grooves each extending in zigzag fashion along a row of central magnetic posts with the conductor positioned to pass along the first side of central magnetic posts at which it is desired to store "0" information bits, and positioned to pass along the second side of central posts at which it is desired to store "1" information bits.

3. A fixed memory as defined in claim 2, wherein said diagonal crosshatch grooves are provided in solely said bottom sheet.

4. A fixed memory comprising
top and bottom sheets of magnetic material assembled in sandwich fashion, at least one surface at the interface between the top and bottom sheets being provided with diagonal crosshatch grooves forming rows and columns of magnetic information storage elements each including a central square magnetic post and adjacent portions on first, second, third and fourth sides of four adjacent posts,
sense conductors in said grooves each extending in zigzag fashion along first and second sides of all central magnetic posts of a column and returning along third and fourth sides of the central magnetic posts of the same column, and
word conductors in said grooves each extending in zigzag fashion along a row of central magnetic posts with the conductor positioned to pass along the first and fourth sides of central magnetic posts at which it is desired to store "0" information bits, and positioned to pass along the second and third sides of central posts at which it is desired to store "1" information bits.

5. A fixed memory comprising
top and bottom sheets of magnetic material assembled in sandwich fashion, at least one surface at the interface between the top and bottom sheets being provided with diagonal crosshatch grooves forming rows and columns of magnetic information storage elements each including a central square magnetic post and adjacent portions on first, second, third and fourth sides of four adjacent posts,
sense conductors in said grooves each extending in zigzag fashion along first and second sides of all central magnetic posts of a column and returning along third and fourth sides of the central magnetic posts of the same column,
word conductors in said grooves each extending in zigzag fashion along a row of central magnetic posts with the conductor positioned to pass along the first and fourth sides of central magnetic posts at which it is desired to store "0" information bits, and positioned to pass along the second and third sides of central posts at which it is desired to store "1" information bits,
means to apply a pulse to any selected one of said word conductors, and
sense amplifiers each coupled to a respective one of said sense conductors.

6. A fixed memory comprising
top and bottom sheets of magnetic material assembled in sandwich fashion, at least one surface at the interface between the top and bottom sheets being provided with diagonal crosshatch grooves forming rows and columns of magnetic information storage elements each including a central square magnetic post and adjacent portions on first, second, third and fourth sides of four adjacent posts,
sense conductors in said grooves each extending in zigzag fashion along first and second sides of all central magnetic posts of a column and returning along third and fourth sides of the central magnetic posts of the same column,
word conductors in said grooves each extending in zigzag fashion along a row of central magnetic posts with the conductor positioned to pass along the first and fourth sides of central magnetic posts at which it is desired to store "0" information bits, and positioned to pass along the second and third sides of central posts at which it is desired to store "1" information bits,
means to apply a pulse to any selected one of said word conductors to induce signals in said sense conductors having polarities corresponding with stored information bits determined by the configuration of the selected word conductor, and
differential sense amplifiers each coupled to ends of a respective one of said sense conductors.

7. A fixed memory comprising
top and bottom sheets of magnetic material assembled in sandwich fashion, at least one surface at the interface between the top and bottom sheets being provided with crosshatch grooves,
a set of sense conductors in said grooves each extending in zigzag fashion in a first general direction diagonally related to the directions of said grooves, and
a set of word conductors in said grooves each extending in zigzag fashion in a second orthogonal general direction also diagonally related to the directions of said grooves,
said word conductors each including portions lying in grooves in parallel coextensive relation with respective portions of each of said sense conductors, at least one of said sets of conductors having unsymmetrical zigzag shapes so that the parallel portions of word and sense conductors have one relative direction for storing a "0" and have the opposite relative direction for storing a "1".

8. A fixed memory comprising
a sheet of magnetic material having a surface provided with diagonal crosshatch grooves forming rows and columns of magnetic information storage elements each including a central square magnetic post and adjacent portions on first, second, third and fourth sides of four adjacent posts,
sense conductors in said grooves each extending in zigzag fashion along first and second sides of all central magnetic posts of a column, and
word conductors in said grooves each extending in zigzag fashion along a row of central magnetic posts with the conductor positioned to pass along the first side of central magnetic posts at which it is desired to store "0" information bits, and positioned to pass along the second side of central posts at which it is desired to store "1" information bits.

9. A fixed memory comprising
a sheet of magnetic material having a surface provided with diagonal crosshatch grooves forming rows and columns of magnetic information storage elements each including a central square magnetic post and adjacent portions on first, second, third and fourth sides of four adjacent posts,
sense conductors in said grooves each extending in zigzag fashion along first and second sides of all central magnetic posts of a column and returning along third and fourth sides of the central magnetic posts of the same column,
word conductors in said grooves each extending in zigzag fashion along a row of central magnetic posts with the conductor positioned to pass along the first and fourth sides of central magnetic posts at which it is desired to store "0" information bits, and positioned to pass along the second and third sides of central posts at which it is desired to store "1" information bits,
means to apply a pulse to any selected one of said word conductors to induce signals in said sense conductors having polarities corresponding with stored information bits determined by the configuration of the selected word conductor, and
differential sense amplifiers each coupled to ends of a respective one of said sense conductors.

10. A fixed memory comprising
a sheet of magnetic material having a surface provided with crosshatch grooves,
a set of sense conductors in said grooves each extending in zigzag fashion in a first general direction diagonally related to the directions of said grooves, and
a set of word conductors in said grooves each extending in zagzag fashion in a second orthogonal general direction also diagonally related to the directions of said grooves, said word conductors each including portions lying in grooves in parallel coextensive relation with respective portions of each of said sense conductors, at least one of said sets of conductors having unsymmetrical zigzag shapes so that the parallel portions of word and sense conductors have one relative direction for storing a "0" and have the opposite relative direction for storing a "1".

References Cited

UNITED STATES PATENTS 3,278,910 10/1966 Bobeck ------------ 340—174

3,274,571 9/1966 Bobeck et al. -------- 340—174

BERNARD KONICK, *Primary Examiner.*

P. SPERBER, *Assistant Examiner.*